United States Patent
Kamijo et al.

(10) Patent No.: US 10,529,237 B2
(45) Date of Patent: Jan. 7, 2020

(54) COLLISION-AVOIDANCE SUPPORT DEVICE

(71) Applicant: TOYOTA JIDOSHA KABUSHIKI KAISHA, Toyota-shi, Aichi (JP)

(72) Inventors: Kentaro Kamijo, Susono (JP); Hiroyuki Takahashi, Miyoshi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 719 days.

(21) Appl. No.: 15/035,262

(22) PCT Filed: Nov. 25, 2013

(86) PCT No.: PCT/JP2013/081635
§ 371 (c)(1),
(2) Date: May 9, 2016

(87) PCT Pub. No.: WO2015/075836
PCT Pub. Date: May 28, 2015

(65) Prior Publication Data
US 2016/0293010 A1    Oct. 6, 2016

(51) Int. Cl.
*B60Q 1/00* (2006.01)
*G08G 1/16* (2006.01)
*B60W 30/09* (2012.01)
*B60W 10/18* (2012.01)
*B60W 10/20* (2006.01)

(52) U.S. Cl.
CPC ............ *G08G 1/166* (2013.01); *B60W 30/09* (2013.01); *B60W 10/18* (2013.01); *B60W 10/20* (2013.01)

(58) Field of Classification Search
CPC .. B60T 2201/022; G08G 1/166; G08G 1/165; G08G 1/164; G08G 1/163; G08G 1/167; B60W 30/09; B60W 10/20; B60W 10/18; G01S 13/931; G01S 2013/9325; G01S 2013/9353; G01S 1517/023; G01S 17/936; G01S 5/0072
USPC ............... 340/435, 436, 903, 461, 426.32
See application file for complete search history.

(56) References Cited

U.S. PATENT DOCUMENTS 5,629,669 A  *  5/1997  Asano ............... B60K 31/0008
                                                  340/435
5,850,176 A  *  12/1998  Kinoshita ............... B60T 7/22
                                                  340/435

(Continued)

FOREIGN PATENT DOCUMENTS

WO       2012/137326 A1    10/2012

*Primary Examiner* — Anh V La
(74) *Attorney, Agent, or Firm* — Sughrue Mion, PLLC

(57) ABSTRACT

In a case where a relative velocity Vr decreases, a timing calculation unit of a collision-avoidance support ECU calculates a time T1 shorter than a time T2, as a time to a collision, using a distance D and the relative velocity Vr without using acceleration Gr. The timing calculation unit calculates a timing of a start of collision-avoidance support on the basis of the time T1. In a case where the relative velocity increases, the timing calculation unit calculates the time T2 shorter than the time T1, as a time to a collision, using the distance D, the relative velocity Vr and the acceleration Gr. The timing calculation unit calculates the timing of a start of collision-avoidance support on the basis of the time T2.

16 Claims, 9 Drawing Sheets

(56) References Cited

U.S. PATENT DOCUMENTS

| | | | | |
|---|---|---|---|---|
| 6,504,473 B2 * | 1/2003 | Ichikawa | ............... | B60T 7/22 340/435 |
| 2010/0052884 A1 * | 3/2010 | Zeppelin | ............ | B60W 30/16 340/435 |
| 2012/0259525 A1 | 10/2012 | Takahashi | | |

* cited by examiner

COLLISION-AVOIDANCE SUPPORT DEVICE

CROSS REFERENCE TO RELATED APPLICATIONS

This application is a National Stage of International Application No. PCT/JP2013/081635 filed Nov. 25, 2013, the contents of all of which are incorporated herein by reference in their entirety.

TECHNICAL FIELD

An embodiment of the present invention relates to a collision-avoidance support device that calculates a timing of a start of collision-avoidance support for avoiding a collision between a host vehicle and an object.

BACKGROUND ART

Techniques for avoiding a collision between a host vehicle and an object have been proposed. For example, Patent Literature 1 discloses a device that calculates a time to an expected collision between a host vehicle and an object while considering a variation in a relative velocity Vr between the host vehicle and the object, on the basis of the relative velocity Vr, the preset amount of deceleration ΔV based on brake actuation of the host vehicle, and deceleration a based on the brake actuation of the host vehicle. The device disclosed in Patent Literature 1 calculates a timing when the time to a collision calculated in consideration of a variation in the relative velocity Vr reaches a predetermined time, as an actuation timing of the brake of the host vehicle.

CITATION LIST

Patent Literature

[Patent Literature 1] Pamphlet of International Publication No. 2012/137326

SUMMARY OF INVENTION

Technical Problem

In the device disclosed in Patent Literature 1, it is possible to calculate the actuation timing of the brake with a high level of accuracy. Incidentally, there are various situations of the host vehicle and the object on the real road. For this reason, it is preferable to calculate a more appropriate timing of a start of collision-avoidance support depending on the situation.

An embodiment of the present invention is contrived in view of the above problem, and an object thereof is to calculate a more appropriate timing of a start of collision-avoidance support depending on the situation.

Solution to Problem

According to an embodiment of the present invention, there is provided a collision-avoidance support device including a timing calculation unit configured to calculate a timing of a start of a collision-avoidance support for avoiding a collision between a host vehicle and an object, wherein the timing calculation unit is configured to: calculate the timing of a start of collision-avoidance support, when a relative velocity of the host vehicle with respect to the object, at the time of setting a direction in which the host vehicle and the object come close to each other to be positive, decreases due to an acceleration of the relative velocity, on the basis of a first time to an expected collision between the host vehicle and the object which is calculated by a first method using the relative velocity and a distance between the host vehicle and the object without using the acceleration; and calculate the timing of a start of collision-avoidance support, when the relative velocity increases due to the acceleration, on the basis of a second time to an expected collision between the host vehicle and the object which is calculated by a second method using the distance, the relative velocity and the acceleration.

According to such a configuration, in a case where the relative velocity decreases due to the deceleration of the host vehicle when the ground speed of a preceding vehicle is constant or the acceleration of the preceding vehicle when the ground speed of the host vehicle is constant, a first time shorter than a second time is calculated as a time to a collision, using the distance and the relative velocity without using the acceleration. In addition, the timing of a start of collision-avoidance support is calculated on the basis of the first time shorter than the second time. Therefore, in a case where the relative velocity decreases due to the deceleration of the host vehicle or the acceleration of the preceding vehicle, the actuation timing of the brake or the like is calculated at a timing earlier than a timing considering a decrease in the relative velocity.

On the other hand, in a case where the relative velocity increases due to the deceleration of the preceding vehicle when the ground speed of the host vehicle is constant, the second time shorter than the first time is calculated as the time to a collision, using the distance, the relative velocity and the acceleration. In addition, the timing of a start of collision-avoidance support is calculated on the basis of the second time shorter than the first time. Therefore, in a case where the relative velocity increases due to the deceleration of the preceding vehicle, the actuation timing of the brake or the like is calculated at a timing earlier than a timing without considering an increase in the relative velocity.

That is, in the embodiment of the present invention, even in a case where the relative velocity either decreases and increases, the earliest brake timing is selected in either a timing considering a change in the relative velocity or a timing without considering a change in the relative velocity. Therefore, it is possible to calculate a more appropriate timing of a start of collision-avoidance support depending on the situation.

In addition, in another embodiment of the present invention, the timing calculation unit can calculate the timing of a start of collision-avoidance support, when a ground speed of the host vehicle increases, on the basis of the first method, regardless of a decrease and an increase in the relative velocity.

In a case where the relative velocity increases due to a driver accelerating the host vehicle intentionally, and a case where the actuation timing of the brake or the like is calculated through a timing earlier than a timing without considering an increase in the relative velocity, there is the possibility of collision-avoidance support from being started at a timing against the driver's intention. However, according to such a configuration, in a case where the ground speed of the host vehicle increases and the relative velocity increases due to the driver accelerating the host vehicle intentionally, the actuation timing of the brake is calculated at a timing later than a timing considering an increase in the relative velocity, and thus it is possible to prevent the collision-avoidance support from being started at a timing against the driver's intention.

In addition, in another embodiment of the present invention, the timing calculation unit can calculate the timing of a start of collision-avoidance support on the basis of the first method, when the relative velocity increases due to the acceleration and the acceleration is equal to or less than a positive threshold after the timing of a start of collision-avoidance support is calculated on the basis of the first method, and calculate the timing of a start of collision-avoidance support on the basis of the second method, when the relative velocity decreases due to the acceleration and the acceleration is equal to or greater than a negative threshold after the timing of a start of collision-avoidance support is calculated on the basis of the second method.

In a situation where a slight increase and decrease in the relative velocity are alternately repeated, there is the possibility of the ground for calculating the timing of a start of collision-avoidance support from being excessively frequently changed. However, according to such a configuration, after the timing of a start of collision-avoidance support is calculated on the basis of the first method, and when the acceleration is not sufficiently great even in a case where the relative velocity increases, the timing of a start of collision-avoidance support is calculated on the basis of the first method without being switched to the calculation of the timing of a start of collision-avoidance support based on the second method.

In addition, after the timing of a start of collision-avoidance support is calculated on the basis of the second method, and when the acceleration is sufficiently low even in a case where the relative velocity decreases, the timing of a start of collision-avoidance support is calculated on the basis of the second method without being switched to the calculation of the timing of a start of collision-avoidance support based on the first method. Therefore, it is possible to prevent the ground for calculating the timing of a start of collision-avoidance support from being excessively frequently changed.

In addition, in another embodiment of the present invention, the timing calculation unit can calculate the timing of a start of collision-avoidance support, in a case where the distance is D, the relative velocity is Vr, the acceleration is Gr, the first time is T1, and the second time is T2, on the basis of the time T1 which is calculated by the following Expression (1) when the relative velocity decreases, and $$T1 = \frac{D}{Vr} \quad (1)$$

calculate the timing of a start of collision-avoidance support on the basis of the time T2 which is calculated by the following Expression (2) when the relative velocity increases.

$$T2 = \frac{-2Vr + \sqrt{4Vr^2 + 8GrD}}{2Gr} \quad (2)$$

Advantageous Effects of Invention

According to the collision-avoidance support device according to an embodiment of the present invention, it is possible to calculate a more appropriate timing of a start of collision-avoidance support depending on the situation.

DESCRIPTION OF EMBODIMENTS

Hereinafter, an example of collision-avoidance support devices according to embodiments of the present invention will be described with reference to the accompanying drawings. A collision-avoidance support device according to a first embodiment of the present invention is configured as a collision-avoidance support system that brings a brake actuator, a steering actuator and the like of a host vehicle into operation at a calculated timing, with respect to an object such as a preceding vehicle or a structure located on the road side.

Figure 1:
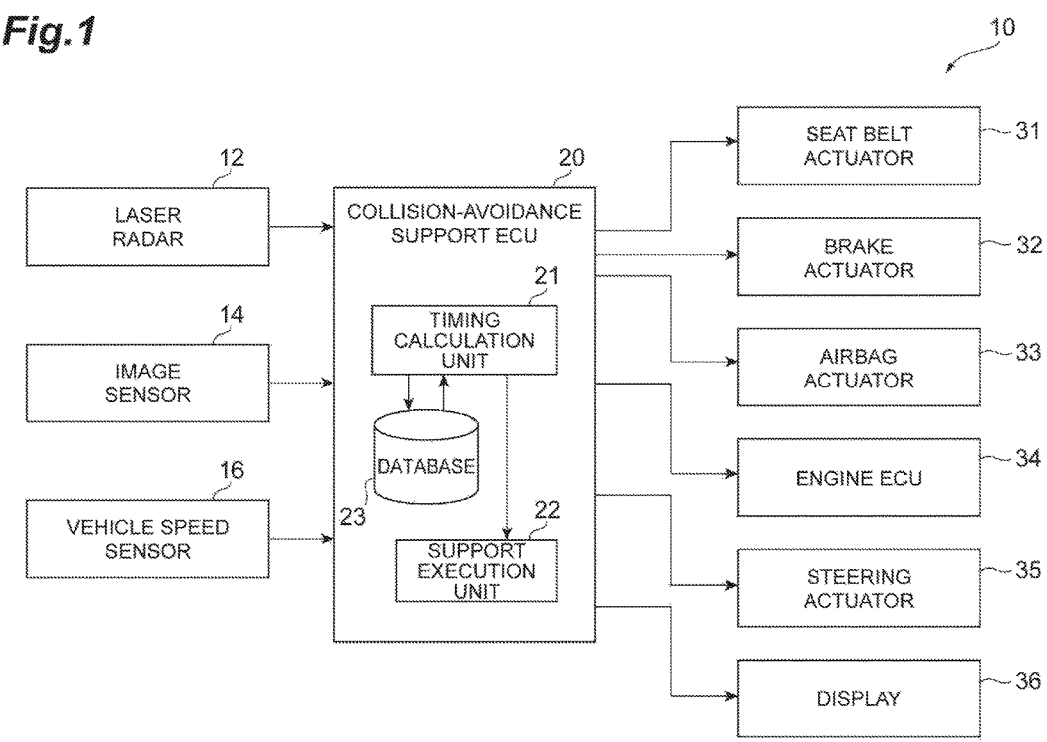
FIG. 1 is a block diagram illustrating a configuration of a collision-avoidance support device according to a first embodiment of the present invention.

As shown in FIG. 1, a collision-avoidance support system 10 of the first embodiment includes a laser radar 12, an image sensor 14, a vehicle speed sensor 16, a collision-avoidance support ECU 20, a seat belt actuator 31, a brake actuator 32, an airbag actuator 33, an engine ECU 34, a steering actuator 35 and a display 36.

The laser radar 12 measures the position, distance, relative velocity and acceleration of the relative velocity of an obstacle such as a preceding vehicle which is an object in front of a host vehicle. The image sensor 14 is constituted by a CMOS camera or a CCD camera, captures an image of the object in front of the host vehicle, and detects the state of the object. The laser radar 12 measures the relative velocity of the host vehicle with respect to the object for each predetermined interval, and calculates the acceleration of the relative velocity from the difference between two relative velocities measured and the interval of measurement. Meanwhile, as measuring means of a positional relationship, a velocity relationship and the like between the vehicle and the object, not only the laser radar 12 but also other means such as a stereo camera may be used. The vehicle speed sensor 16 detects a ground speed which is a speed of the host vehicle with respect to the surface of the ground and the acceleration of the ground speed, from the rotational speed of the wheel axle of the host vehicle.

As described later, the collision-avoidance support ECU 20 determines the possibility of contact and the timing from information such as the relative velocity to the object obtained by the laser radar 12 and the image sensor 14, and controls the actuation of various devices of the seat belt actuator 31 to the display 36. The collision-avoidance support ECU 20 includes a timing calculation unit 21, a support execution unit 22 and a database 23. The timing calculation unit 21 calculates a time to an expected collision between the host vehicle and the object, using any of two methods described later. In addition, the timing calculation unit 21 calculates a timing of a start of collision-avoidance support for avoiding a collision between the host vehicle and the object, on the basis of the time to an expected collision between the host vehicle and the object. A timing calculation unit is constituted by the timing calculation unit 21.

The support execution unit 22 brings various devices of the seat belt actuator 31 to the display 36 into operation, through a command signal, at the timing of a start of collision-avoidance support which is calculated by the timing calculation unit 21. The database 23 has data to be referred to when the timing calculation unit 21 performs calculation and a history of the calculation performed by the timing calculation unit 21, recorded therein.

When there is the possibility of contact, the seat belt actuator 31 increases the tensile force of a seat belt on the basis of a command signal of the support execution unit 22 of the collision-avoidance support ECU 20. The brake actuator 32 decelerates the host vehicle by actuating the brake of the host vehicle, on the basis of the command signal of the support execution unit 22 of the collision-avoidance support ECU 20. When there is the possibility of contact, the airbag actuator 33 extends an airbag on the basis of the command signal of the support execution unit 22 of the collision-avoidance support ECU 20. The engine ECU 34 controls the output of the engine of the host vehicle on the basis of the command signal of the support execution unit 22 of the collision-avoidance support ECU 20.

The steering actuator 35 controls the steering angle of the host vehicle on the basis of the command signal of the support execution unit 22 of the collision-avoidance support ECU 20. The steering actuator 35 may give a predetermined reactive force to the steering wheel of the host vehicle on the basis of the command signal of the support execution unit 22 of the collision-avoidance support ECU 20, to urge a driver to perform steering for avoiding a collision. The display 36 gives information and a warning for avoiding a collision to the driver, through video and a voice, on the basis of the command signal of the support execution unit 22 of the collision-avoidance support ECU 20.

Hereinafter, the operation of the collision-avoidance support system 10 according to the first embodiment will be described. First, problems of a current system based on the knowledge of the inventor will be described. As described above, the device that calculates a timing of collision-avoidance support while considering a change in relative velocity has been proposed.

However, for example, in a case where the relative velocity decreases due to the deceleration of the host vehicle when the ground speed of the preceding vehicle is constant or the acceleration of a preceding vehicle when the ground speed of the host vehicle is constant, the actuation timing of the brake which is calculated in consideration of a decrease in the relative velocity becomes later than in a case where the actuation timing of the brake is calculated without considering a decrease in the relative velocity. In this case, a driver is present who feels the actuation timing of the brake to be excessively late. The sense of this driver will be described below.

For example, a situation is assumed in which a preceding vehicle traveling in front of the host vehicle is present. The distance between the host vehicle and the preceding vehicle is set to D, the relative velocity of the host vehicle with respect to the preceding vehicle at the time of a direction in which the host vehicle and the preceding vehicle come close to each other being set to be positive is set to Vr, the acceleration of the relative velocity Vr in the direction in which the host vehicle and the preceding vehicle come close to each other is set to Gr, and the time to an expected collision between the host vehicle and the preceding vehicle is set to t. In a case where the acceleration Gr of the relative velocity Vr is not considered, that is, in a case of the acceleration Gr=0, the following Expression (3) is established.

$$D = Vr \times t \tag{3}$$

On the other hand, in a case where the acceleration Gr of the relative velocity Vr is considered, that is, in a case of the acceleration Gr≠0, the following Expression (4) is established.

$$\frac{1}{2} Gr t^2 + Vr t = D \tag{4}$$

A method of calculating a time to an expected collision between the host vehicle and the preceding vehicle using the distance D and the relative velocity Vr between the host vehicle and the object without using the acceleration Gr is defined as a first method. Using the first method, the time to an expected collision between the host vehicle and the preceding vehicle in a case where the acceleration Gr of the relative velocity Vr is not considered is defined as a first time. The first time is set to establish the relation of t=T1. On the other hand, a method of calculating a time to an expected collision between the host vehicle a preceding vehicle using the distance D, the relative velocity Vr and the acceleration Gr is defined as a second method. Using the second method, the time to an expected collision between the host vehicle and the preceding vehicle in a case where the acceleration Gr of the relative velocity Vr is considered is defined as a second time. The second time is set to establish the relation of t=T2. Then, the following Expressions (5) and (6) are obtained from Expressions (3) and (4).

$$T1 = \frac{D}{Vr} \tag{5}$$

$$T2 = \frac{-2Vr + \sqrt{4Vr^2 + 8GrD}}{2Gr} \quad (6)$$

Meanwhile, as shown in the following Expression (7), T2 in a case where the acceleration Gr of the relative velocity Vr is 0 becomes the same as T1 in a case where the acceleration Gr of the relative velocity Vr is not considered.

$$T2 = \frac{D}{Vr} \quad (7)$$

Figure 3:
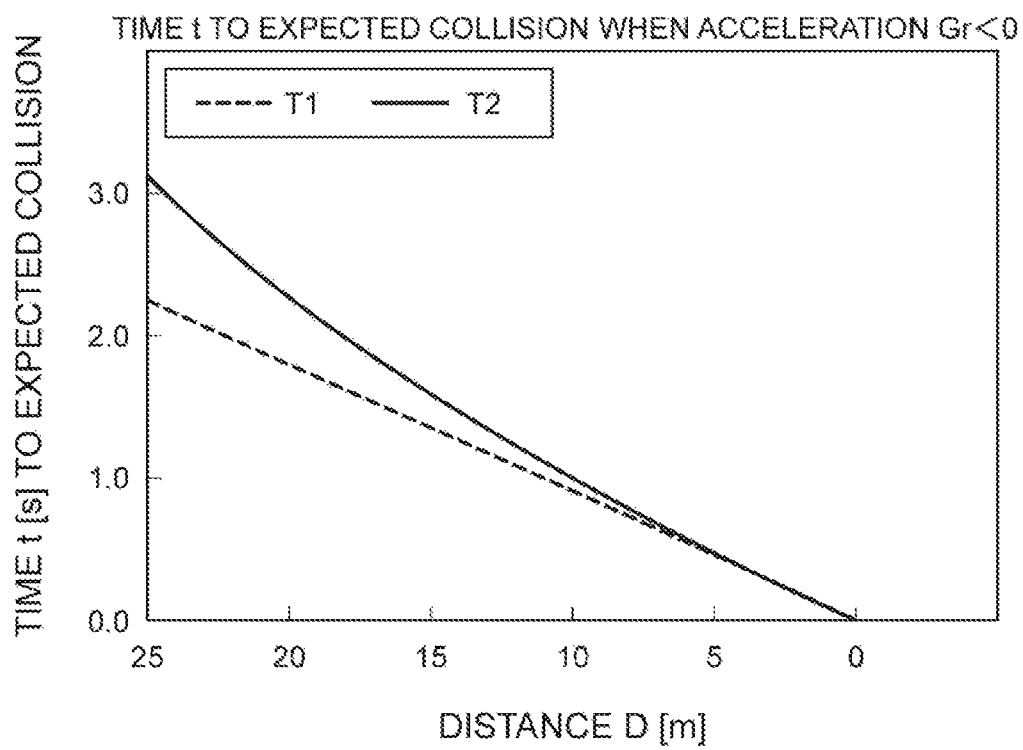
FIG. 3 is a graph illustrating a time T1 to an expected collision which is calculated using a distance D and a relative velocity Vr without using an acceleration Gr and a time T2 to an expected collision which is calculated using the distance D, the relative velocity Vr and the acceleration Gr, respectively, with respect to the distance D, when the relative velocity Vr decreases.

In FIG. 3, a situation is assumed in which the relations of Vr=40 [km/h] and the distance D=25 [m] are initially established, and the relative velocity Vr decreases at the acceleration Gr=−2 [m/s²]. FIG. 3 shows the times T1 and T2 to an expected collision when the distance D is set to any D [m] from D=25 [m]. As shown in FIG. 3, the relation of T2>T1 is established when Gr<0.

That is, the time T2 to a collision considering the acceleration Gr is longer than the time T1 to a collision without considering the acceleration Gr, with respect to the same relative velocity Vr and distance D. Therefore, in a case where collision-avoidance support of brake actuation or the like is performed when the times T1 and T2 to a collision are set to predetermined times, the timing of collision-avoidance support based on the time T2 to a collision considering the acceleration Gr becomes later than the timing of collision-avoidance support based on the time T1 to a collision without considering the acceleration Gr, with respect to the same relative velocity Vr and the distance D.

Figure 5:
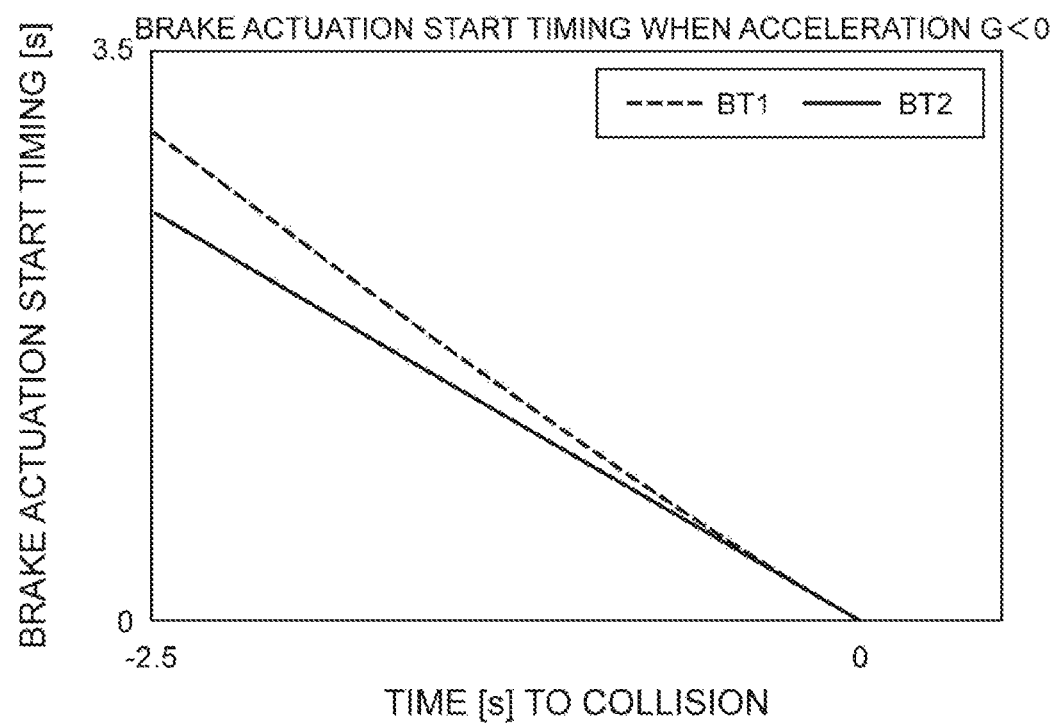
FIG. 5 is a graph illustrating a brake timing BT1 calculated on the basis of the time T1 and a brake timing BT2 calculated on the basis of the time T2, respectively, with respect to a time to a collision, when the relative velocity Vr decreases.

The horizontal axis of FIG. 5 represents a time to a collision. The vertical axis of FIG. 5 represents how many seconds before a collision the brake is actuated with respect to the time to a collision. As shown in FIG. 5, when the relative velocity Vr decreases, it is determined that a brake timing BT2 considering the acceleration Gr is later than a brake timing BT1 without considering the acceleration Gr, with respect to the time to a collision.

For this reason, in a case where the relation of the acceleration Gr<0 is established due to the deceleration of the host vehicle or the acceleration of the preceding vehicle, and the relative velocity Vr then decreases, the actuation timing of the brake or the like calculated in consideration of a change in the relative velocity becomes later than in a case of the actuation timing of the brake calculated without considering a decrease in the relative velocity Gr. In this case, a driver accustomed to the actuation timing of the brake or the like calculated without considering a decrease in the relative velocity Gr feels the actuation timing of the brake or the like to be late, and thus there is the possibility of the driver feeling a sense of discomfort.

Figure 4:
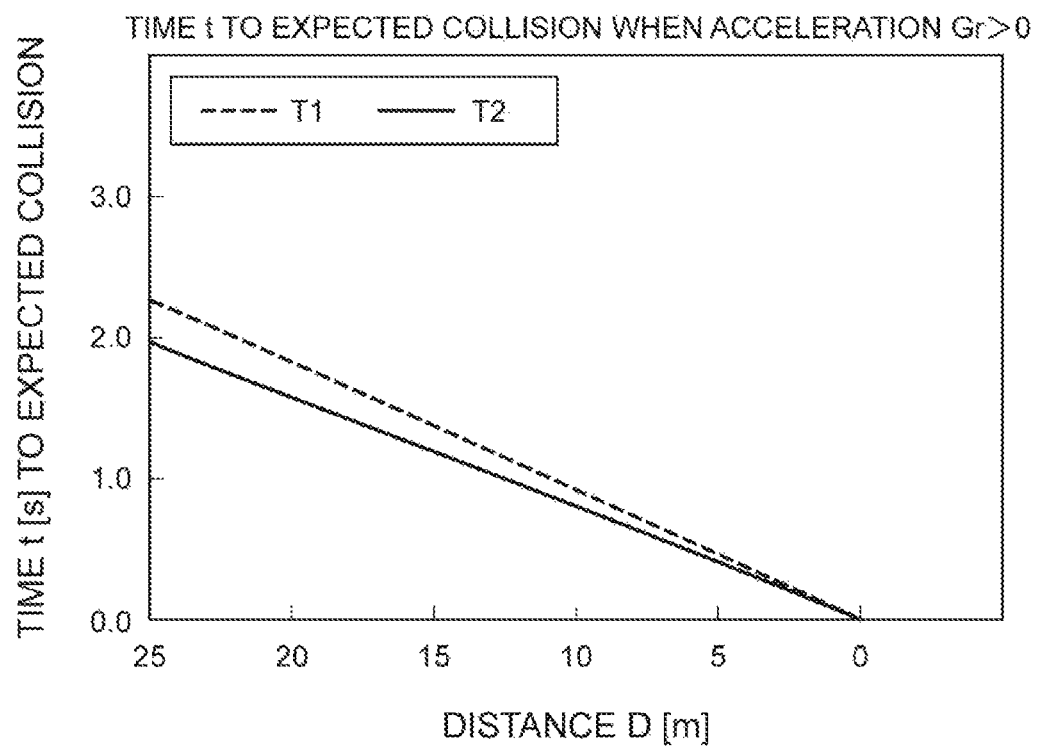
FIG. 4 is a graph illustrating the time T1 to an expected collision which is calculated using the distance D and the relative velocity Vr without using the acceleration Gr and the time T2 to an expected collision which is calculated using the distance D, the relative velocity Vr and the acceleration Gr, respectively, with respect to the distance D, when the relative velocity Vr increases.

On the other hand, in FIG. 4, a situation is assumed in which the relations of Vr=40 [km/h] and the distance D=25 [m] are initially established, and the relative velocity Vr increases at the acceleration Gr=2 [m/s²]. FIG. 4 shows times T1 and T2 to an expected collision when the distance D is set to any D [m] from D=25 [m]. As shown in FIG. 4, the relation of T2<T1 is established when Gr>0.

That is, the time T2 to a collision considering the acceleration Gr is shorter than the time T1 to a collision without considering the acceleration Gr, with respect to the same relative velocity Vr and distance D. Therefore, in a case where collision-avoidance support of brake actuation or the like is performed when the times T1 and T2 to a collision are set to predetermined times, the timing of collision-avoidance support based on the time T2 to a collision considering the acceleration Gr becomes earlier than the timing of collision-avoidance support based on the time T1 to a collision without considering the acceleration Gr, with respect to the same relative velocity Vr and the distance D.

Figure 6:
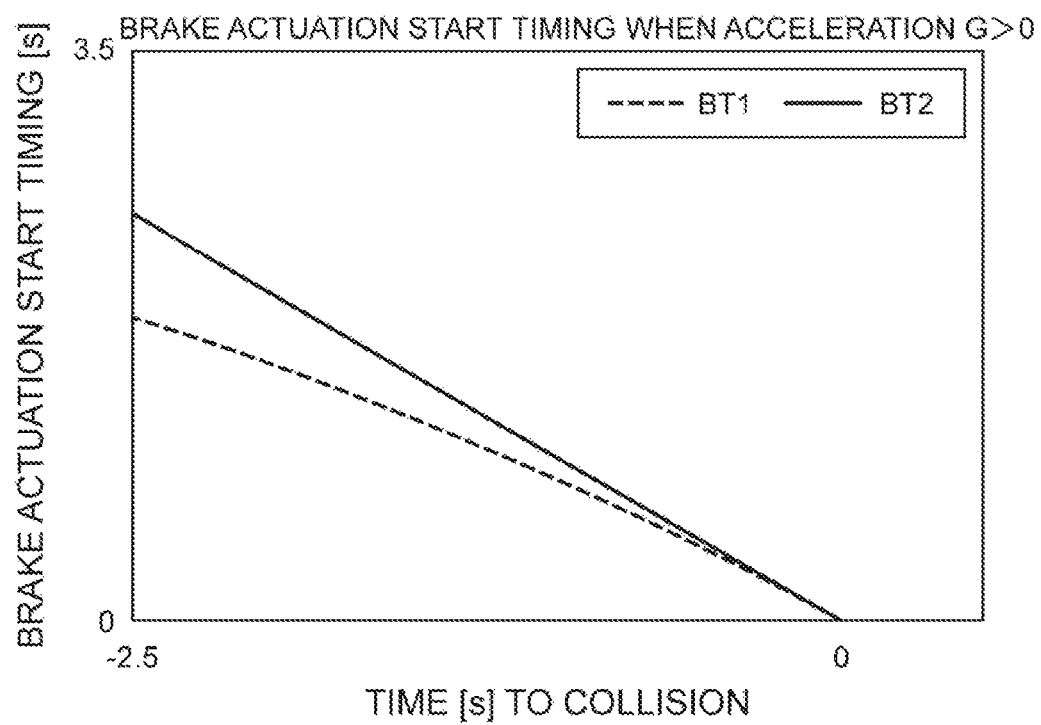
FIG. 6 is a graph illustrating the brake timing BT1 calculated on the basis of the time T1 and the brake timing BT2 calculated on the basis of the time T2, respectively, with respect to a time to a collision, when the relative velocity Vr increases.

The horizontal axis of FIG. 6 represents a time to a collision. The vertical axis of FIG. 6 represents how many seconds before a collision the brake is actuated with respect to the time to a collision. As shown in FIG. 6, when the relative velocity Vr increases, it is determined that the brake timing BT2 considering the acceleration Gr is earlier than the brake timing BT1 without considering the acceleration Gr, with respect to the time to a collision.

Figure 2:
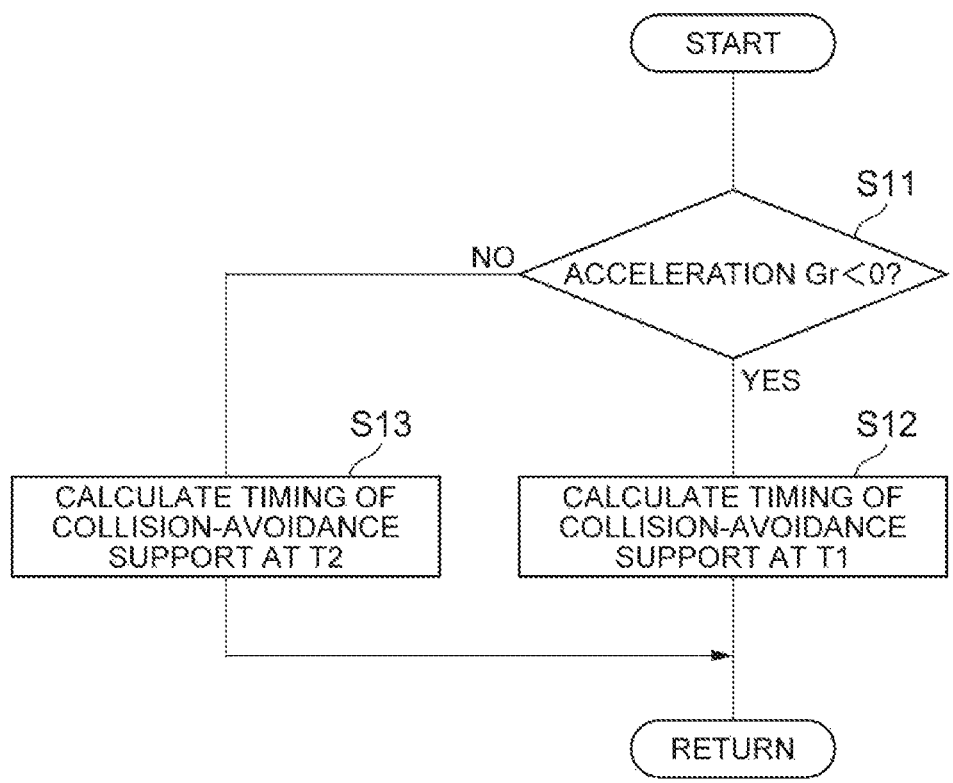
FIG. 2 is a flow diagram illustrating an operation of the collision-avoidance support device according to the first embodiment of the present invention.

Consequently, in the present embodiment, operations shown below are performed. As shown in FIG. 2, when the acceleration Gr detected by the laser radar 12 is in the relation of Gr<0 (S11), the timing calculation unit 21 of the collision-avoidance support ECU 20 calculates the timing of a start of collision-avoidance support, using the first method, on the basis of the time T1 to a collision calculated without considering the acceleration Gr (S12). The timing calculation unit 21 and the support execution unit 22 of the collision-avoidance support ECU 20 performs collision-avoidance support, using the seat belt actuator 31 to the display 36, through the timing of a start of collision-avoidance support calculated on the basis of T1.

The timing of a start of collision-avoidance support can be set to, for example, the time T1=1 to 3 seconds. As shown in FIG. 3, since T1 calculated without considering the acceleration Gr when Gr<0 is shorter than T2, the timing of a start of collision-avoidance support of brake actuation or the like based on T1 becomes earlier than the timing of a start of collision-avoidance support of brake actuation or the like based on T2.

On the other hand, the acceleration Gr detected by the laser radar 12 is not in the relation of Gr<0 (S11), the timing calculation unit 21 of the collision-avoidance support ECU 20 calculates the timing of a start of collision-avoidance support, using the second method, on the basis of the time T2 to a collision calculated in consideration of the acceleration Gr (S13). The timing calculation unit 21 and the support execution unit 22 of the collision-avoidance support ECU 20 performs collision-avoidance support, using the seat belt actuator 31 to the display 36, through the timing of a start of collision-avoidance support calculated on the basis of T2.

The timing of a start of collision-avoidance support can be set to, for example, the time T2=1 to 3 seconds. As shown in FIG. 4, since T2 calculated in consideration of the acceleration Gr when Gr>0 is shorter than T1, the timing of a start of collision-avoidance support of brake actuation or the like based on T1 becomes earlier than the timing of a start of collision-avoidance support of brake actuation or the like based on T2.

In the present embodiment, in a case where the relative velocity Vr decreases due to the deceleration of the host vehicle or the acceleration of the preceding vehicle, the timing calculation unit 21 of the collision-avoidance support ECU 20 calculates the time T1 shorter than the time T2, as the time to a collision, using the distance D and the relative velocity Vr without using the acceleration Gr. In addition, the timing calculation unit 21 calculates the timing of a start of collision-avoidance support on the basis of the time T1 shorter than the time T2. For this reason, in a case where the relative velocity Gr decreases due to the deceleration of the host vehicle when the ground speed of another vehicle is constant or the acceleration of the preceding vehicle when the ground speed of the host vehicle is constant, the actuation timing of the brake or the like is calculated at a timing earlier than a timing considering a decrease in the relative velocity Gr.

On the other hand, in a case where the relative velocity increases due to the deceleration of the preceding vehicle when the ground speed of the host vehicle is constant, the timing calculation unit 21 of the collision-avoidance support ECU 20 calculates the time T2 shorter than the time T1, as the time to a collision, using the distance D, the relative velocity Vr and the acceleration Gr. In addition, the timing calculation unit 21 calculates the timing of a start of collision-avoidance support on the basis of the time T2 shorter than the time T1. For this reason, in a case where the relative velocity Vr increases due to the deceleration of the preceding vehicle when the ground speed of the host vehicle is constant, the actuation timing of the brake or the like is calculated at a timing earlier than a timing without considering an increase in the relative velocity Vr.

That is, in the present embodiment, even in a case where the relative velocity Vr either decreases and increases, the earliest brake timing is selected in either a timing considering a change in the relative velocity Vr or a timing without considering a change in the relative velocity. Therefore, it is possible to calculate a more appropriate timing of a start of collision-avoidance support depending on the situation. In addition, since a method in which an earlier brake timing is obtained is selected in either a method considering a change in the relative velocity Vr or a method without considering a change in the relative velocity, it is possible to prevent a sense of discomfort from being given to a driver.

Hereinafter, a second embodiment of the present invention will be described. In the first embodiment, when the ground for calculating a timing of a start of collision-avoidance support is switched between T1 based on the first method and T2 based on the second method, there is the possibility of the timing of a start of collision-avoidance support being excessively frequently switched in a case where the threshold of switching is set to Gr=0. Consequently, in the present embodiment, the timing of collision-avoidance support is switched in consideration of a history of the timing of collision-avoidance support.

In the present embodiment, the database 23 has a history recorded therein, the history being related to whether the timing calculation unit 21 has calculated the timing of a start of collision-avoidance support on the basis of either T1 based on the first method or T2 based on the second method, during the calculation of a previous timing of a start of collision-avoidance support. The timing calculation unit 21 refers to a history of calculation recorded in the database 23, during the calculation of the timing of a start of collision-avoidance support. The timing calculation unit 21 refers to the history of the database 23, to thereby determine whether the timing of a start of collision-avoidance support has been calculated on the basis of either T1 based on the first method or T2 based on the second method, during the calculation of the previous timing of a start of collision-avoidance support.

In the present embodiment, after the timing of a start of collision-avoidance support is calculated on the basis of T1 based on the first method without considering the acceleration Gr, a positive threshold Gp=1 m/s$^2$ is set as the threshold of switching of the ground for calculating a timing of a start of collision-avoidance support.

Figure 7:
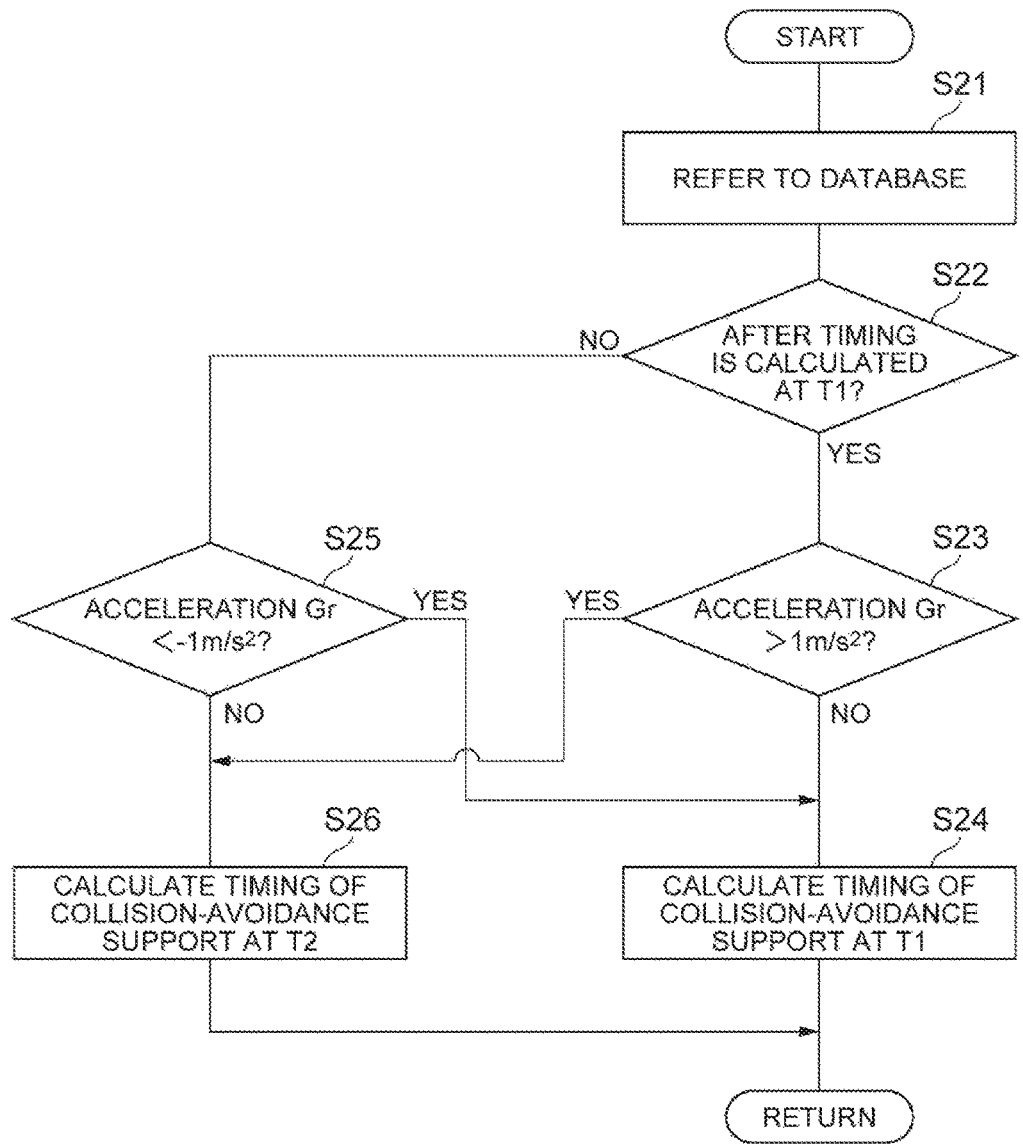
FIG. 7 is a flow diagram illustrating an operation of a collision-avoidance support device system according to a second embodiment of the present invention.

As shown in FIG. 7, the timing calculation unit 21 refers to the history of calculation recorded in the database 23 (S21). After the timing of a start of collision-avoidance support is calculated on the basis of T1 based on the first method without considering the acceleration Gr (S22), and when the relation of Gr≤Gp=1 m/s$^2$ is established even in a case of the acceleration Gr>0 (S23), the timing calculation unit 21 of the collision-avoidance support ECU 20 calculates the timing of a start of collision-avoidance support of brake actuation or the like on the basis of T1 based on the first method without switching the ground for calculating the timing of a start of collision-avoidance support (S24).

After the timing of a start of collision-avoidance support is calculated on the basis of T1 based on the first method without considering the acceleration Gr (S22), and when the relation of Gr>Gp=1 m/s$^2$ is established (S23), the timing calculation unit 21 of the collision-avoidance support ECU 20 switches the ground for calculating the timing of a start of collision-avoidance support, and calculates the timing of a start of collision-avoidance support of brake actuation or the like on the basis of T2 based on the second method (S26). Gp=1 m/s$^2$ which is the threshold of the acceleration Gr in this case can be set to other values.

On the other hand, in the present embodiment, after the timing of a start of collision-avoidance support is calculated on the basis of T2 based on the second method considering the acceleration Gr, a negative threshold Gm=−1 m/s$^2$ is set as the threshold of switching of the ground for calculating the timing of a start of collision-avoidance support.

After the timing of a start of collision-avoidance support is calculated on the basis of T2 considering the acceleration Gr (S22), and when the relation of Gr>Gm=−1 m/s$^2$ is established even in a case of the acceleration Gr<0 (S25), the timing calculation unit 21 of the collision-avoidance support ECU 20 calculates the timing of a start of collision-avoidance support of brake actuation or the like on the basis of T2 based on the second method without switching the ground for calculating the timing of a start of collision-avoidance support (S26).

After the timing of a start of collision-avoidance support is calculated on the basis of T2 based on the second method considering the acceleration Gr (S22), and when the relation of Gr<Gm=−1 m/s$^2$ is established (S25), the timing calculation unit 21 of the collision-avoidance support ECU 20 switches the ground for calculating the timing of a start of collision-avoidance support, and calculates the timing of a start of collision-avoidance support of brake actuation or the like on the basis of T1 based on the first method (S24). Gm=−1 m/s$^2$ which is the threshold of the acceleration Gr in this case may be set to other values.

Meanwhile, in the present embodiment, the timing calculation unit 21 can erase the history of calculation recorded in the database 23 at any timing. In this case, immediately after the history of calculation of the database 23 is erased, the timing calculation unit 21 performs calculation in the procedure of FIG. 2 according to the first embodiment. The history of calculation in this case is recorded in the database 23. In a case where the timing of a start of collision-avoidance support is calculated again before the history of calculation of the database 23 is erased again at any timing, the timing calculation unit 21 can perform calculation while referring to the history of the database 23 in the procedure of FIG. 7 according to the present embodiment.

For example, the timing calculation unit 21 calculates the timing of a start of collision-avoidance support, and then can erase the history of calculation recorded in the database 23 after the elapse of a predetermined time. In addition, the timing calculation unit 23 calculates the timing of a start of collision-avoidance support, and then can erase the history of calculation recorded in the database 23 when the engine of the host vehicle is stopped. In addition, the timing calculation unit 21 can erase the history of calculation recorded in the database 23 when the preceding vehicle which is an object falls outside of the range of detection of the laser radar, and when the preceding vehicle changes to another vehicle.

According to the present embodiment, after the timing of a start of collision-avoidance support is calculated on the basis of the time T1, and when the acceleration is not sufficiently great rather than Gr>1 m/s$^2$ even in a case where the relative velocity Vr increases due to the acceleration Gr, the timing of a start of collision-avoidance support is calculated on the basis of the time T1 without being switched to the calculation of the timing of a start of collision-avoidance support based on the time T2.

In addition, after the timing of a start of collision-avoidance support is calculated on the basis of the time T2, and when deceleration is not sufficiently great rather than Gr<−1 m/s$^2$ even in a case where the relative velocity Vr decreases, the timing of a start of collision-avoidance support is calculated on the basis of the time T2 without being switched to the calculation of the timing of a start of collision-avoidance support based on the time T1. Therefore, it is possible to prevent the ground for calculating the timing of a start of collision-avoidance support from being excessively frequently changed.

Hereinafter, a third embodiment of the present invention will be described. In the first embodiment, in case where both the host vehicle and the front preceding vehicle accelerate with respect to the surface of the ground, and the acceleration of the ground speed of the preceding vehicle is smaller than the acceleration of the ground speed of the host vehicle, the relation of the acceleration Gr>0 of the relative velocity Vr is established, and thus the collision-avoidance support is started earlier than the timing of T1 through the timing of T2. However, since a driver accelerates the host vehicle with his/her intention, collision-avoidance support is performed at a timing against the driver's intention when the timing of a start of collision-avoidance support is early.

Figure 8:
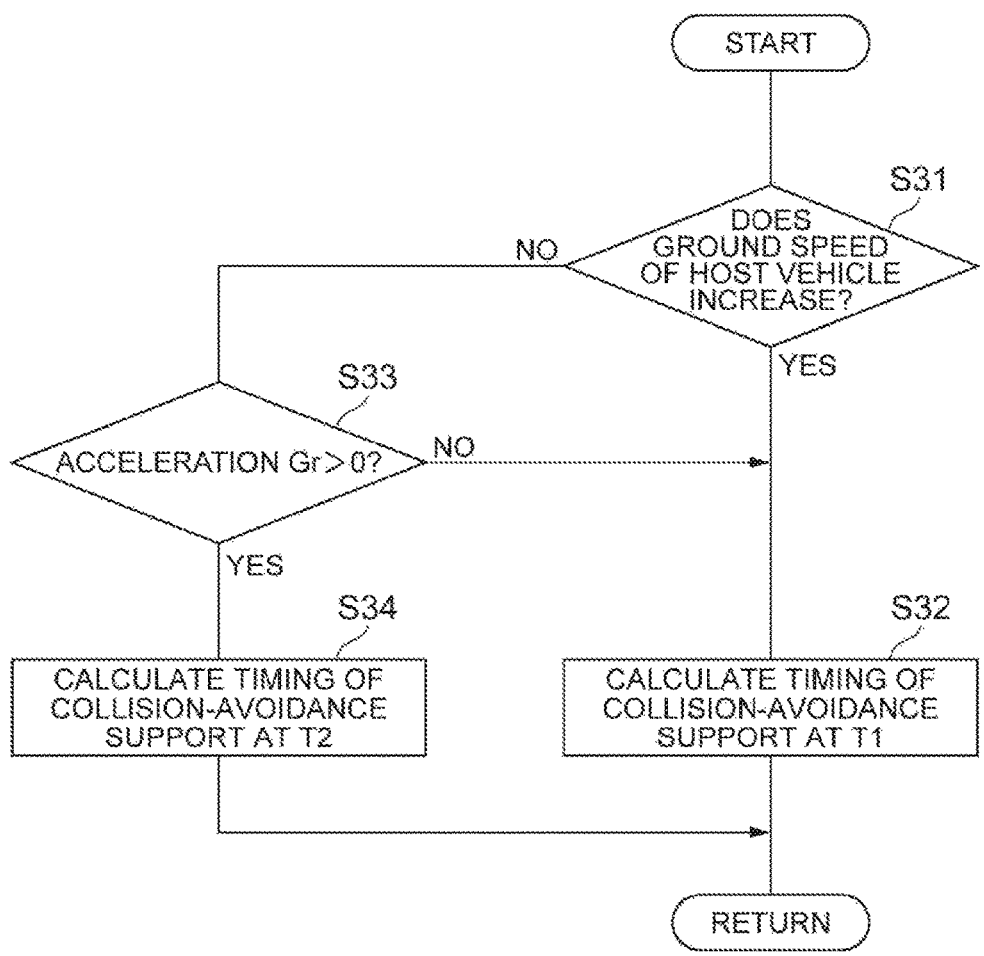
FIG. 8 is a flow diagram illustrating an operation of a collision-avoidance support device according to a third embodiment of the present invention.

Consequently, in the present embodiment, the timing of a start of collision-avoidance support is calculated while considering that the host vehicle is both accelerated and decelerated. As shown in FIG. 8, when it is detected by the vehicle speed sensor 16 that the ground speed of the host vehicle increases (S31), the timing calculation unit 21 of the collision-avoidance support ECU 20 calculates the timing of a start of collision-avoidance support of brake actuation or the like on the basis of T1 based on the first method without considering the acceleration Gr, regardless of whether the acceleration Gr of the relative velocity Vr is Gr>0 or Gr<0 (S32).

On the other hand, when it is detected by the vehicle speed sensor 16 that the ground speed of the host vehicle does not increase (S31), and when the acceleration Gr of the relative velocity Vr is not Gr>0 (S33), the timing calculation unit 21 of the collision-avoidance support ECU 20 calculates the timing of a start of collision-avoidance support of brake actuation or the like on the basis of T1 based on the first method without considering the acceleration Gr (S32).

In addition, when it is detected by the vehicle speed sensor 16 that the ground speed of the host vehicle does not increase (S31), and when the acceleration Gr of the relative velocity Vr is Gr>0 and the relative velocity Vr increases (S33), the timing calculation unit 21 of the collision-avoidance support ECU 20 calculates the timing of a start of collision-avoidance support of brake actuation or the like on the basis of T2 based on the second method considering the acceleration Gr (S34).

According to the present embodiment, in a case where the ground speed of the host vehicle increases and the relative velocity Vr increases due to a driver accelerating the host vehicle intentionally, the timing calculation unit 21 of the collision-avoidance support ECU 20 calculates the actuation timing of the brake or the like at a timing later than a timing considering an increase in the relative velocity Vr. Therefore, it is possible to prevent the collision-avoidance support from being performed at a timing against the intention of a driver who has accelerated the host vehicle intentionally.

Hereinafter, a fourth embodiment of the present invention will be described. In the third embodiment, as is the case with the first embodiment, when the host vehicle is not accelerated, the timing of a start of collision-avoidance support is switched depending on the relative velocity Vr decreasing or increasing. However, in a case where the threshold of switching is set to Gr=0, there is the possibility of the timing of collision-avoidance support being excessively frequently switched. Consequently, in the present embodiment, as is the case with the second embodiment, the timing of collision-avoidance support is switched in consideration of a history of the timing of collision-avoidance support.

Figure 9:
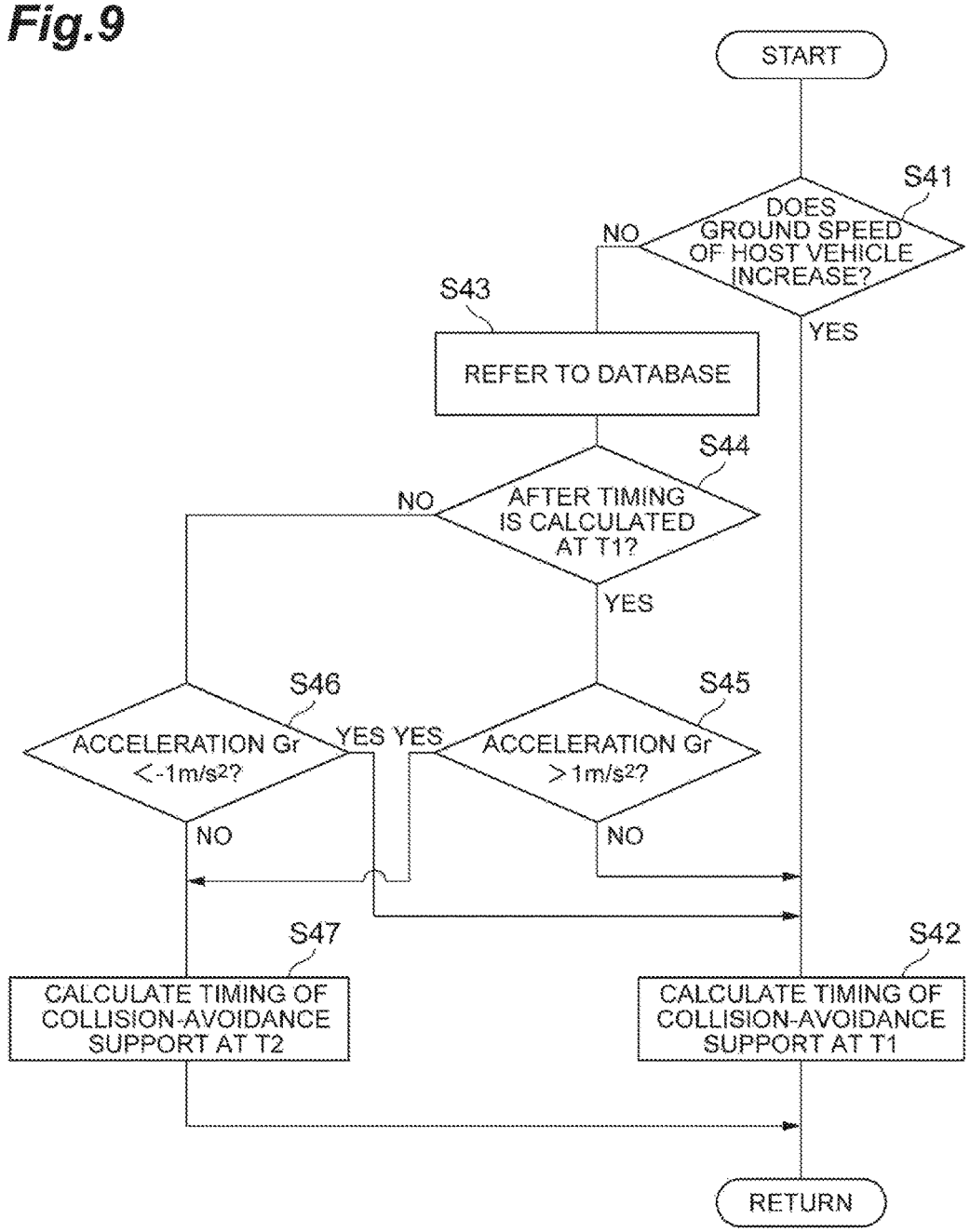
FIG. 9 is a flow diagram illustrating an operation of a collision-avoidance support device according to a fourth embodiment of the present invention.

As shown in FIG. 9, when it is detected by the vehicle speed sensor 16 that the ground speed of the host vehicle increases (S41), the timing calculation unit 21 of the collision-avoidance support ECU 20 calculates the timing of a start of collision-avoidance support of brake actuation or the like on the basis of T1 without considering the acceleration Gr, regardless of whether the acceleration Gr of the relative velocity Vr is Gr>0 or Gr<0 (S42).

On the other hand, when it is not detected by the vehicle speed sensor 16 that the ground speed of the host vehicle increases (S41), the timing calculation unit 21 refers to the history of calculation recorded in the database 23 (S43). After the timing of a start of collision-avoidance support is calculated on the basis of T1 based on the first method without considering the acceleration Gr (S44), and when the relation of Gr>1 m/s$^2$ is not established (S45), the timing calculation unit 21 of the collision-avoidance support ECU 20 calculates the timing of a start of collision-avoidance support of brake actuation or the like on the basis of T1 based on the first method without switching the ground for calculating the timing of a start of collision-avoidance support (S42).

When it is not detected by the vehicle speed sensor 16 that the ground speed of the host vehicle increases (S41), the timing calculation unit 21 refers to the history of calculation recorded in the database 23 (S43). As a result, after the timing of a start of collision-avoidance support is calculated on the basis of T1 based on the first method without considering the acceleration Gr (S44), and when the relation of Gr>1 m/s$^2$ is established (S45), the timing calculation unit 21 of the collision-avoidance support ECU 20 switches the ground for calculating the timing of a start of collision-avoidance support, and calculates the timing of a start of collision-avoidance support of brake actuation or the like on the basis of T2 based on the second method (S47).

On the other hand, when it is not detected by the vehicle speed sensor 16 that the ground speed of the host vehicle increases (S41), the timing calculation unit 21 refers to the history of calculation recorded in the database 23 (S43). As a result, after the timing of a start of collision-avoidance support is calculated on the basis of T2 based on the second method considering the acceleration Gr (S44), and when the relation of Gr<−1 m/s² is not established (S46), the timing calculation unit 21 of the collision-avoidance support ECU 20 calculates the timing of a start of collision-avoidance support of brake actuation or the like on the basis of T2 based on the second method without switching the ground for calculating the timing of a start of collision-avoidance support (S47).

When it is not detected by the vehicle speed sensor 16 that the ground speed of the host vehicle increases (S41), the timing calculation unit 21 refers to the history of calculation recorded in the database 23 (S43). As a result, after the timing of a start of collision-avoidance support is calculated on the basis of T2 based on the second method considering the acceleration Gr (S44), and when the relation of Gr<−1 m/s² is established (S46), the timing calculation unit 21 of the collision-avoidance support ECU 20 switches the ground for calculating the timing of a start of collision-avoidance support, and calculates the timing of a start of collision-avoidance support of brake actuation or the like on the basis of T1 based on the first method (S42).

In the present embodiment, as is the case with the third embodiment, when the ground speed of the host vehicle increases, it is possible to prevent the collision-avoidance support from being performed at a timing against the intention of a driver who has accelerates the host vehicle intentionally, and to prevent a sense of discomfort from being given to the driver. In addition, in the present embodiment, when the ground speed of the host vehicle does not increase, as is the case with the second embodiment, it is possible to prevent the ground for calculating the timing of a start of collision-avoidance support from being excessively frequently changed.

The present invention can be variously modified without being limited to the above embodiments. For example, in the above embodiments, the collision-avoidance support has been described with a focus on an aspect of bringing the brake into operation on the basis of T1 or T2. However, in the collision-avoidance support, the collision-avoidance support device ECU 20 brings the steering actuator 35 into operation on the basis of T1 or T2, and thus it is also possible to avoid an object. In addition, in the collision-avoidance support, the collision-avoidance support device ECU 20 brings the seat belt actuator 31 and the airbag actuator 33 into operation on the basis of T1 or T2, and thus it is also possible to reduce damage during a collision. In addition, in the collision-avoidance support, the collision-avoidance support ECU 20 presents information to a driver or notifies the driver of a warning through the display 36 on the basis of T1 or T2, and thus it is possible to urge a driver to avoid a collision. In addition, in the above embodiment, description has been given with a focus on an aspect in which the timing calculation unit 21 calculates any of times T1 and T2 using any of two methods. However, for example, a unit for calculating the time T1 and a unit for calculating the time T2 may be separately included. These units may calculate the time T1 and the time T2, respectively, and may have any of times T1 and T2 applied thereto depending on the situation.

INDUSTRIAL APPLICABILITY

According to the collision-avoidance support device according to an embodiment of the present invention, it is possible to prevent a sense of discomfort from being given to a driver.

REFERENCE SIGNS LIST

10: collision-avoidance support system
12: laser radar
14: image sensor
16: vehicle speed sensor
20: collision-avoidance support ECU
21: timing calculation unit
22: support execution unit
23: database
31: seat belt actuator
32: brake actuator
33: airbag actuator
34: engine ECU
35: steering actuator
36: display

The invention claimed is:
1. A collision-avoidance support device comprising:
a processor configured to:
determine whether an acceleration of a relative velocity of a host vehicle with respect to an object is above a predetermined acceleration threshold;
based on the acceleration of the relative velocity being determined to be below the predetermined acceleration threshold: (i) calculate a first time to an expected collision between the host vehicle and the object, the first time being calculated by a first method using the relative velocity and a distance between the host vehicle and the object without using the acceleration of the relative velocity, and (ii) based on the first time reaching a predetermined timing threshold, start at least one collision-avoidance support function; and
based on the acceleration of the relative velocity being determined to be above the predetermined acceleration threshold: (i) calculate a second time to the expected collision between the host vehicle and the object, the second time being calculated by a second method using the distance, the relative velocity and the acceleration of the relative velocity, and (ii) based on the second time reaching the predetermined timing threshold, start the at least one collision-avoidance support function.

2. The collision-avoidance support device according to claim 1, wherein the processor is further configured to: when a ground speed of the host vehicle increases: (i) calculate the first time, on the basis of the first method, regardless of whether the acceleration of the relative velocity is above the predetermined acceleration threshold, and (ii) based on the first time reaching the predetermined timing threshold, start the at least one collision-avoidance support function, the ground speed of the host vehicle being a speed of the host vehicle with respect to a surface of the ground.

3. The collision-avoidance support device according to claim 1, wherein the processor is further configured to at least one of:
after the first time has been calculated on the basis of the first method, set the predetermined acceleration threshold to increase; or
after the second time has been calculated on the basis of the second method, set the predetermined acceleration threshold to decrease.

4. The collision-avoidance support device according to claim 2, wherein the processor is further configured to at least one of:
after the first time has been calculated on the basis of the first method, set the predetermined acceleration threshold to increase; or
after the second time has been calculated on the basis of the second method, set the predetermined acceleration threshold to decrease.

5. The collision-avoidance support device according to claim 1, wherein the processor is configured to at least one of:
calculate the first time, where the distance is D, the relative velocity is Vr, and the first time is T1, based on the following Expression (1):

$$T1 = \frac{D}{Vr}; \quad (1)$$

or
calculate the second time, where the distance is D, the relative velocity is Vr, the acceleration is Gr, and the second time is T2, based on the following Expression (2):

$$T2 = \frac{-2Vr + \sqrt{4Vr^2 + 8GrD}}{2Gr}. \quad (2)$$

6. The collision-avoidance support device according to claim 2, wherein the processor is configured to at least one of:
calculate the first time, where the distance is D, the relative velocity is Vr, and the first time is T1, based on the following Expression (1):

$$T1 = \frac{D}{Vr}; \quad (1)$$

or
calculate the second time, where the distance is D, the relative velocity is Vr, the acceleration is Gr, and the second time is T2, based on the following Expression (2):

$$T2 = \frac{-2Vr + \sqrt{4Vr^2 + 8GrD}}{2Gr}. \quad (2)$$

7. The collision-avoidance support device according to claim 3, wherein the processor is configured to at least one of:
calculate the first time, where the distance is D, the relative velocity is Vr, and the first time is T1, based on the following Expression (1):

$$T1 = \frac{D}{Vr}; \quad (1)$$

or
calculate the second time, where the distance is D, the relative velocity is Vr, the acceleration is Gr, and the second time is T2, based on the following Expression (2):

$$T2 = \frac{-2Vr + \sqrt{4Vr^2 + 8GrD}}{2Gr}. \quad (2)$$

8. The collision-avoidance support device according to claim 4, wherein the processor is configured to at least one of:
calculate the first time, where the distance is D, the relative velocity is Vr, and the first time is T1, based on the following Expression (1):

$$T1 = \frac{D}{Vr}; \quad (1)$$

or
calculate the second time, where the distance is D, the relative velocity is Vr, the acceleration is Gr, and the second time is T2, based on the following Expression (2):

$$T2 = \frac{-2Vr + \sqrt{4Vr^2 + 8GrD}}{2Gr}. \quad (2)$$

9. The collision-avoidance support device according to claim 1, further comprising: a laser radar that measures a position, a distance, a relative velocity and an acceleration of the relative velocity of the obstacle, which is an object in front of the host vehicle.

10. The collision-avoidance support device according to claim 1, further comprising: an image sensor that captures an image of the object, which is an object in front of the host vehicle, and detects a state of the object.

11. The collision-avoidance support device according to claim 1, further comprising: a vehicle speed sensor that detects a ground speed which is a speed of the host vehicle with respect to a surface of the ground, and an acceleration of the ground speed, from a rotational speed of a wheel axle of the host vehicle.

12. The collision-avoidance support device according to claim 1, wherein the at least one collision-avoidance support function includes at least one of: a seat belt actuator increasing a tensile force of a seat belt, actuating a brake, extending an airbag, controlling output of an engine, controlling a steering angle of a steering wheel, giving a predetermined reactive force to the steering wheel or causing a warning regarding an expected collision to be displayed or audibly output to a driver.

13. The collision-avoidance support device according to claim 1, wherein the at least one collision-avoidance support function includes at least one of: a seat belt actuator increasing a tensile force of a seat belt, actuating a brake, extending an airbag, controlling output of an engine, or controlling a steering angle of a steering wheel.

14. The collision-avoidance support device according to claim 1, wherein the predetermined acceleration threshold is zero.

15. The collision-avoidance support device according to claim 1, wherein the acceleration of the relative velocity is based on a difference between two relative velocities measured and an interval of measurement.

16. The collision-avoidance support device according to claim 1, wherein the object is a moving object in front of the host vehicle.

* * * * *